(12) United States Patent
Mikan et al.

(10) Patent No.: US 8,388,500 B2
(45) Date of Patent: *Mar. 5, 2013

(54) FITNESS APPLICATIONS OF A WIRELESS DEVICE

(75) Inventors: Jeffrey Mikan, Cumming, GA (US); Justin McNamara, Atlanta, GA (US); Fulvio Cenciarelli, Suwanee, GA (US); Anastasios L. Kefalas, Alpharetta, GA (US); John E. Lewis, Lawrenceville, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/529,388

(22) Filed: Jun. 21, 2012

(65) Prior Publication Data

US 2012/0264463 A1  Oct. 18, 2012

Related U.S. Application Data

(63) Continuation of application No. 12/879,107, filed on Sep. 10, 2010, now Pat. No. 8,235,871, which is a continuation of application No. 11/615,065, filed on Dec. 22, 2006, now Pat. No. 7,811,201.

(51) Int. Cl.
*A63B 71/00* (2006.01)
*G06F 19/00* (2011.01)

(52) U.S. Cl. .................................. 482/9; 482/4; 700/91

(58) Field of Classification Search .............. 482/1, 4–9, 482/900, 908; 700/91, 93; 434/247, 255; 709/208

See application file for complete search history.

(56) References Cited

U.S. PATENT DOCUMENTS

| | | | |
|---|---|---|---|
| 6,244,988 B1 * | 6/2001 | Delman ............................ 482/8 |
| 6,458,060 B1 | 10/2002 | Watterson et al. |
| 6,638,198 B1 | 10/2003 | Shea |
| 6,648,798 B2 | 11/2003 | Yoo |
| 6,669,600 B2 | 12/2003 | Warner |
| 6,786,848 B2 * | 9/2004 | Yamashita et al. ................. 482/8 |
| 6,902,513 B1 | 6/2005 | McClure |
| 6,921,351 B1 | 7/2005 | Hickman et al. |
| 6,991,586 B2 * | 1/2006 | Lapcevic ........................... 482/8 |
| 7,254,516 B2 * | 8/2007 | Case et al. ..................... 702/182 |
| 7,811,201 B1 | 10/2010 | Mikan et al. |
| 2002/0022551 A1 | 2/2002 | Watterson et al. |
| 2006/0058156 A1 | 3/2006 | Cohen et al. |
| 2006/0058704 A1 | 3/2006 | Graichen et al. |
| 2006/0063644 A1 | 3/2006 | Yang |
| 2010/0331147 A1 | 12/2010 | Mikan et al. |

OTHER PUBLICATIONS

"Note to Apple . . . Microsoft Beat you this Time", Mobility Today, http://mobilitytoday.com/news/apple_tsk_tsk_microsoft.html, accessed Mar. 9, 2007, 4 pages.
Apple—Nike—+ iPod—Gear "Get In Gear", http://www/apple.com/ipod/nike/gear.html, accessed Mar. 8, 2007, 3 pages. Apple—Nike + iPod—Run, "Rock 'n' Run", http://www.apple.com/ipod/nike/run.html, accessed Mar. 8, 2007, 2 pages.
Apple—Nike + iPod—Sync, "Stay in Sync", http://www.apple.com/ipod/nike/sync.html, accessed Mar. 8, 2007, 2 pages.
Nordictrack, "New iFit® Workout Cards", © 2007, http://www.nordictrack.com/webapp/wcs/stores/servlet/Category2_-1_10301_12401_21053, accessed Mar. 9, 2007, 3 pages.

* cited by examiner

*Primary Examiner* — Loan Thanh
*Assistant Examiner* — Sandhara Ganesan
(74) *Attorney, Agent, or Firm* — Woodcock Washburn LLP

(57) ABSTRACT

Methods and systems for use in connection with a fitness routine and/or an exercise apparatus. In one such method, fitness information is stored in a fitness analysis system and operative communication is established with an exercise apparatus and/or a wireless communication device. A fitness information request is received at the fitness analysis system, and the system sends a setting associated with the exercise apparatus to facilitate a workout using an exercise apparatus. The system receives exercise information corresponding to the workout, and updates fitness information during the workout. The updated fitness information is analyzed to generate associated with the exercise apparatus to facilitate a subsequent workout.

18 Claims, 7 Drawing Sheets

FITNESS APPLICATIONS OF A WIRELESS DEVICE

CROSS-REFERENCE TO RELATED APPLICATION

This application claims priority to and is a continuation of U.S. patent application Ser. No. 12/879,107, filed Sep. 10, 2010, and entitled "Fitness Applications of a Wireless Device." U.S. patent application Ser. No. 12/879,107 claims priority to and is a continuation of U.S. patent application Ser. No. 11/615,065, filed Dec. 22, 2006, and entitled "Fitness Applications of a Wireless Device," which has issued with U.S. Pat. No. 7,811,201. U.S. patent application Ser. No. 12/879,107, U.S. patent application Ser. No. 11/615,065, and U.S. Pat. No. 7,811,201 are each herein incorporated by reference in their respective entireties.

BACKGROUND

Wireless device users frequently bring wireless devices (e.g., cellular telephones, MP3 players, etc.) with them wherever they go to stay in touch with the outside world, to play music and so forth. Users commonly use a wireless device for these reasons while exercising.

When a user exercises in a gym, electronic and other exercise equipment may be present. Electronic exercise equipment usually has several settings that should be adjusted before a suitable workout can be provided to the user. For example, if a user wishes to use a treadmill, the user may need to set the user's age, gender, weight, desired speed, desired incline and/or desired pre-set exercise program. The more sophisticated and feature-laden the exercise equipment, the more involved the set up process typically becomes. Even in the case of non-electronic exercise equipment, settings must be remembered by the user, or written down for future use. Otherwise, the user will either risk using the equipment improperly, or will have to determine the proper settings every time he or she uses the equipment. For example, weight equipment typically has settings for weight, seat position and the like.

Various forms of feedback may be provided to the user once the user has completed the workout. For example, the number of repetitions the user performed, distance run, calories expended, average heart rate, etc., are all types of information that may be useful in determining future workouts or tracking a user's progress. Conventionally, such information may need to be recorded manually, such as in a paper notebook. Specialized exercise equipment, such as a heart rate monitor, may record feedback information that it recorded itself, but typically such specialized devices do not record information from other devices, such as electronic exercise equipment.

SUMMARY

In view of the above limitations and drawbacks, methods and wireless devices for use in connection with a fitness program and/or an exercise apparatus is disclosed herein. In one such method, fitness information is stored in a memory and operative communication is established with an exercise apparatus. At least a subset of the fitness information is sent to the exercise apparatus to facilitate a user workout using the exercise apparatus. Exercise information corresponding to the user workout is received from the exercise apparatus, and the at least a subset of the fitness information is updated in the memory according to the received exercise information.

One such wireless device includes a memory that stores fitness information, where at least a subset of the fitness information is related to an exercise apparatus. The wireless device also includes a user interface module that permits user interaction with the wireless device, and an exercise communication module. The exercise communication module communicates with the exercise apparatus and sends the at least a subset of the fitness information to the exercise apparatus to facilitate a user workout.

In another such method, fitness information is stored in a memory of a wireless device, and at least a subset of the fitness information is presented to a user. Exercise information relating to a user workout is received from the user, and the fitness information is updated based on the received exercise information.

BRIEF DESCRIPTION OF THE DRAWINGS

The foregoing Summary, as well as the following detailed description, is better understood when read in conjunction with the appended drawings. For the purpose of illustrating various embodiments, there is shown in the drawings example embodiments; however, embodiments are not limited to the specific methods and instrumentalities disclosed. In the drawings.

DETAILED DESCRIPTION

The subject matter of the disclosed embodiments is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

The embodiments disclosed herein allow a person to use a wireless device in connection with a fitness program and/or an exercise apparatus. For example, fitness information (e.g., exercise equipment settings, workout results and other workout information, fitness goals, etc.) may be stored within a wireless device. The user may use the wireless device to access the fitness information and use the information before or during the workout. The user may also input fitness information into the wireless device for future use in workout planning, fitness progress tracking and the like. In one embodiment, the wireless device may operatively communicate with an exercise apparatus (e.g., a treadmill, elliptical trainer, stationary bicycle and the like) to communicate equipment settings, user information, etc. to the apparatus and receive workout information, etc., from the apparatus. The various fitness information that may be stored in the wireless device may be communicated to a database, computer or other device by way of a network for fitness tracking and planning purposes or the like.

In the discussion that follows, details relating to wireless devices and networks are assumed to be known to those skilled in the art. Accordingly, such details are largely omitted herein for the sake of clarity and explanation. In addition, any references herein to an example embodiment involving a cellular telephone is solely for purposes of explanation, and is not intended to limit the invention to any such embodiment. For example, a wireless device as contemplated by various embodiments of the invention may include, but are not limited to: cellular telephones, personal digital assistants (PDAs), email devices and the like. The wireless device may operate in a cellular, SMR, PCS, cordless, unlicensed AWS, 700 MHz, or other spectrums. Furthermore, embodiments are not limited by the network servicing the device. Accordingly, embodiments may be applicable to any network type including, for example, TDMA, CDMA, WCDMA, GSM, WiFi, WiMAX, OFDM, UMTS, EV-DO, HSDPA/HSUPA and other standards now known or to be developed in the future.

Figure 1A:
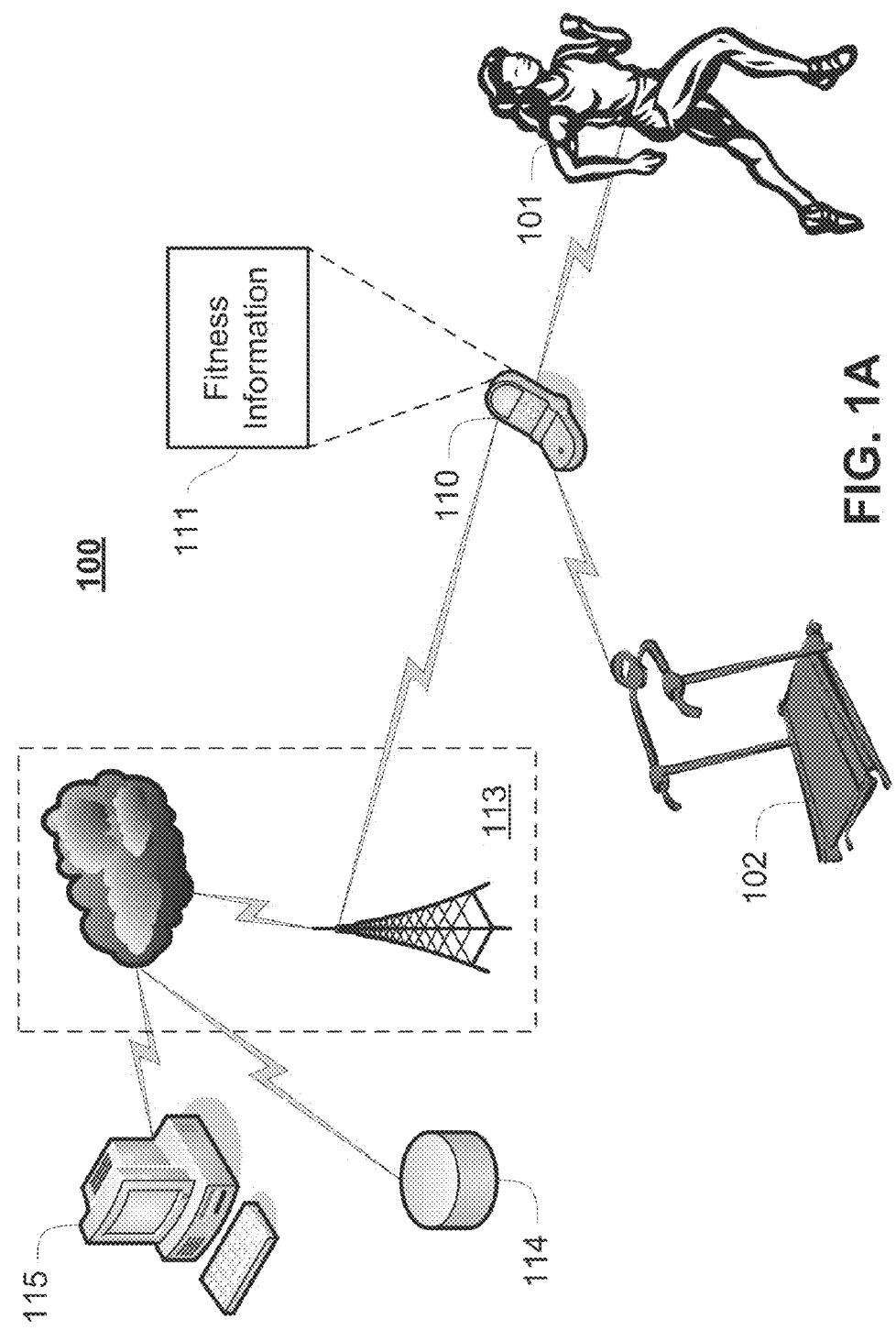
FIG. 1A illustrates an example configuration in which aspects of an embodiment may be employed.

FIG. 1A is a diagram illustrating an example configuration 100 of exercise apparatus 102 and wireless device 110 in accordance with an embodiment. As can be seen in FIG. 1A, wireless device 110 may store fitness information 111. Fitness information 111 may be any type of information that may be used by user 101 in connection with a fitness regimen. A non-exhaustive and non-limiting list of example fitness information 111 may include: exercise apparatus 102 settings (e.g., speed, incline, resistance, weight, seat position, etc.), user 101 fitness information (e.g., height, weight, body mass index, heart rate information, caloric/diet information, etc.), user 101 fitness tracking data (e.g., data and/or analysis of past workouts, advice for future workouts, planned future workouts, etc.) and the like.

Wireless device 110 may, in one embodiment, be in operative communication with exercise apparatus 102. In such an embodiment, operative communication may be enabled wirelessly, such as a by way of a Bluetooth® connection or the like, or may be enabled in a wired fashion such as by way of a cradle, cable or other type of physical connection between wireless device 110 and exercise apparatus 102. When in operative communication with exercise apparatus 102, wireless device 110 may send any type of fitness information 111 to exercise apparatus 102. Wireless device 110 may send such fitness information 111 to exercise apparatus 102 before, during and/or after a user 101 workout on exercise apparatus 102. In addition, exercise apparatus 102 may send fitness information 111 to wireless device 110, either before, during and/or after a user 101 workout on exercise apparatus 102.

In accordance with one embodiment, wireless device 110 may communicate with communication network 113. As was discussed above, any type of communication network 113 may be used in connection with an embodiment. Communication network 113 may enable operative communication between wireless device 110, database 114, computer 115 and the like. In such a manner, fitness information 111 from wireless device 110 or from exercise apparatus 102 may be communicated to database 114 and/or computer 115. In one embodiment, computer 115 may be, for example, user 101's personal computer, which may store database 114 within a memory of computer 115 such as a hard disk or the like.

Database 114 or computer 115 may perform analysis or other functions with respect to fitness information 111, for example, and may communicate further information back to exercise apparatus 102 and/or wireless device 110. Database 114 may be any combination of hardware and/or software that is capable of storing fitness information 111 and allowing analysis thereon. In an alternative embodiment, computer 115 may access database 114 by way of a web site or the like. In such an embodiment, the web site may be specially designed for fitness-related information and functionality, may be a personal user 101 web site or the like.

Figure 1B:
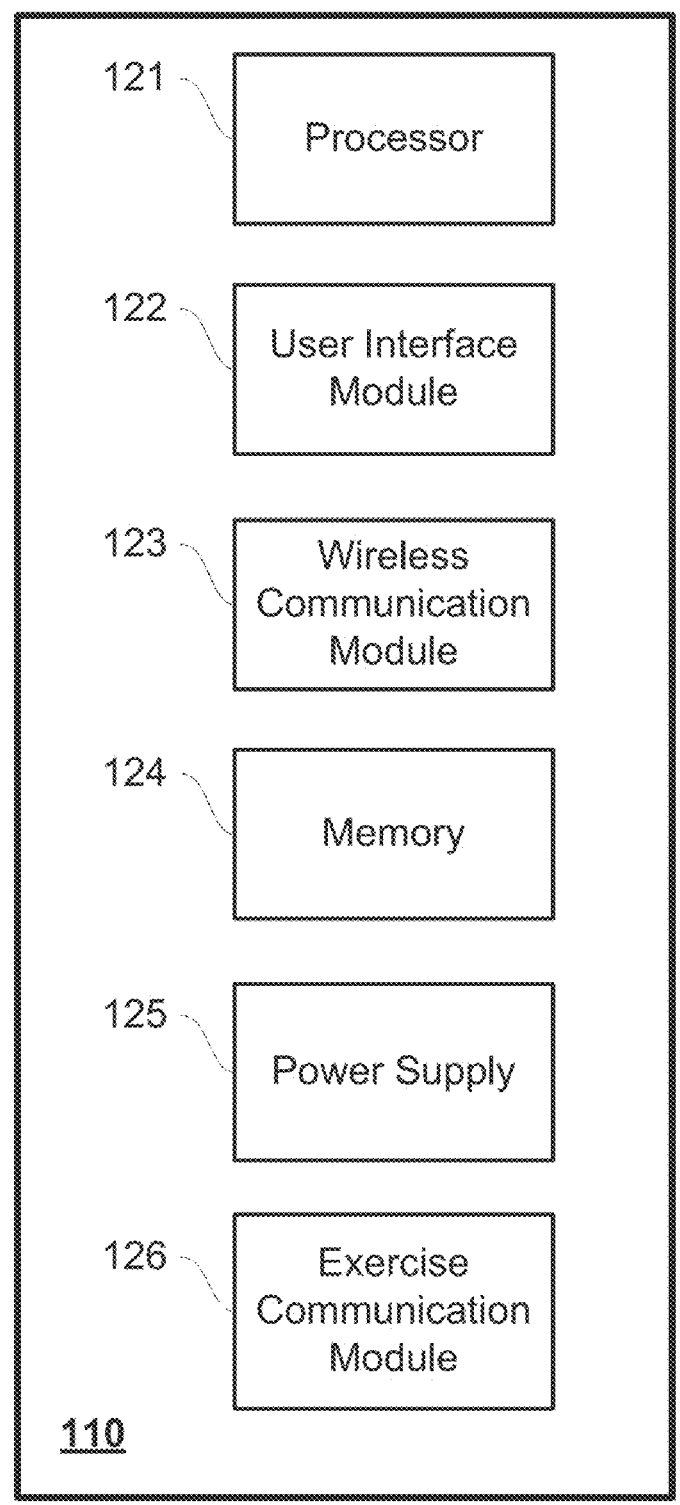
FIG. 1B illustrates an example wireless device that may be used in connection with an embodiment.

FIG. 1B illustrates an example wireless device 110 that may be used in connection with an embodiment. References will also be made to FIG. 1A as appropriate. It will be appreciated that the components and modules of wireless device 110 illustrated in FIG. 1B are illustrative, and that any number and type of components and/or modules may be present in wireless device 110. In addition, the functions performed by any or all of the components and modules illustrated in FIG. 1B may be performed by any number of physical components. Thus, it is possible that in some embodiments the functionality of more than one component and/or module illustrated in FIG. 1B may be performed by any number or types of hardware and/or software.

Processor 121 may be any type of circuitry that performs operations on behalf of wireless device 110. In one embodiment, processor 121 executes software (i.e., computer readable instructions stored in a computer readable medium) that includes fitness-related functionality. Such software may be a part of, may include, or may access, for example, exercise communication module 126, to be discussed below. User interface module 122 may be any type or combination of hardware and/or software that enables user 101 to operate and interact with wireless device 110. For example, user interface module 122 may include a display, physical and "soft" keys, voice recognition software, microphone, speaker and the like. Wireless communication module 122 may be any type or combination of hardware and/or software that enables wireless device 110 to communicate with communication network 113. Memory 124 enables wireless device 110 to store information, such as fitness information 111 and the like. Memory 124 may take any form, such as internal random access memory (RAM), an SD card, a microSD card and the like. Power supply 125 may be a battery or other type of power input (e.g., a charging cable that is connected to an electrical outlet, etc.) that is capable of powering wireless device 110.

Exercise communication module 126 may be any type or combination of hardware and/or software that enables wireless device 110 to communicate with exercise apparatus 102. As noted above, exercise communication module 126 may also include (or may be a part of) fitness-related software that enables wireless device 110 to provide fitness-related functionality. In another embodiment, exercise communication module 126 may be accessed by fitness-related software for communication purposes, while other fitness-related functionality is provided by the software. In one embodiment, wireless communication module 123 may perform the functions of exercise communication module 126. In an alternative embodiment, exercise communication module 126 may be separate from wireless communication module 123.

In one embodiment, exercise communication module 126 may enable communication between wireless device 110 and exercise apparatus 102 by way of, for example, Bluetooth or some other standard that is currently in use or to be developed in the future. The use of a standard communication protocol would help to enable communication between wireless device 110 and Bluetooth-enabled exercise apparatus 102, regardless of the brand of exercise apparatus 102 (or wireless device 110) being used. It will be appreciated that in some instances a software program, circuitry or the like may need to be added to conventional exercise apparatus 102 and/or wireless device 110 to enable such communication. It should be noted that while the above discussion focuses on the use of a standard communication protocol to enable communication with a wide range of exercise apparatus 102, an embodiment may be used in connection with a proprietary communication protocol as well.

In an embodiment where a wired connection between wireless device 110 and exercise apparatus 102 is used, exercise communication module 126 may include a USB or other type of physical connection component that may be used to connect wireless device 110 to exercise apparatus 102. In either a wireless or wired connection between wireless device 110 and exercise apparatus 102, a cradle or other type of docking station may be part of exercise apparatus 102 or the like, and may be used to secure wireless device 110 to exercise apparatus 102 during a workout. If a wired connection is used, a connector may be a part of the docking station such that wireless device 110 is connected to exercise apparatus 102 when inserted into the docking station. The docking station may be adjustable or of a universal-fit type, for example.

Although not illustrated in FIG. 1B, wireless device 110 may include additional features, such as a pedometer, accelerometer, heart rate monitor or the like. The information collected from these features also may be stored as part of fitness information 111 and used for tracking or workout creation purposes, for example.

Figure 2A:
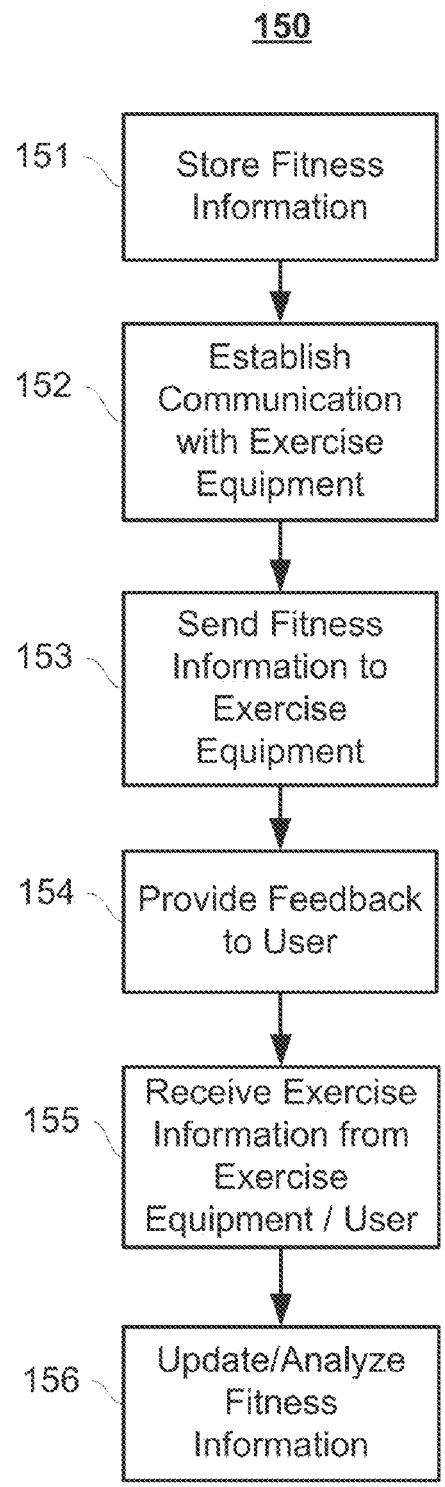
FIGS. 2A-B are flowcharts illustrating example methods in accordance with an embodiment.

FIG. 2A is a flowchart illustrating an example method 150 in accordance with an embodiment. References will also be made to FIGS. 1A-B where appropriate. Method 150 may take place, for example, when wireless device 110 and exercise apparatus 102 are able to be in operative communication with each other. At 151, fitness information 111 is stored within wireless device 110 such as, for example, in memory 124. As was noted above, such storage may be performed automatically or manually by, for example, a user of wireless device 110. At 152, operative communication between wireless device 110 and exercise apparatus 102 is established. Such communication may be enabled according to, for example, Bluetooth standards or some other communication protocol. In addition, and as was noted above, such communication may be wired or wireless. In an embodiment where such communication is wired, a cradle or other docking mechanism may be available on exercise apparatus 102 so as to enable user 101 to physically connect wireless device 110 to exercise apparatus 102.

At 153, fitness information 111 is sent from wireless device 110 to exercise apparatus 102. It will be appreciated that, in an embodiment, a subset of fitness information 111 stored in wireless device 110 may be transferred to exercise apparatus 102 (e.g., a subset of fitness information 111 that is relevant to exercise apparatus 102 and/or the workout planned by user 101), rather than all of fitness information 111. Fitness information 111 may enable exercise apparatus 102 to set or adjust settings on behalf of user 101. For example, if exercise apparatus 102 is a treadmill, fitness information 111 may include, but is not limited to: user 101 height, weight and age, incline setting, speed setting, workout program, desired heart rate or desired heart rate range, maximum heart rate, duration of workout, etc. Thus, a treadmill that has received fitness information 111 from wireless device 110 may be able to, for example, automatically adjust the incline of the running platform, set an initial speed or workout program, set a desired heart rate range for user 101, and so forth. User 101 may then simply begin the workout without needing to adjust any settings.

Alternatively, user 101 may adjust the settings that were preset by exercise apparatus 102 according to fitness information 111. In such a situation, it will be appreciated that user 101 may only need to make minor adjustments to the settings, rather than having to adjust settings from a default setting of exercise apparatus 102, or from the settings used by a previous user of exercise apparatus 102. It will be appreciated that during the workout other functions may be performed by wireless device 110. For example, user 101 may use wireless device 110 to send or receive a phone call, text message or the like, view Internet content, listen to music, play a game and so forth.

At 154, feedback may be provided to user 101 from either wireless device 110, exercise apparatus 102 or both. Such feedback may be provided during or after the workout. For example, in one embodiment, feedback may include workout tracking data (e.g., percent completed, heart rate, calories expended, etc.). Feedback may be presented visually or audibly. For example, in an embodiment where wireless device includes artificial speech software, feedback may include spoken encouragement, workout information or the like. In addition, or in place of feedback, audio or visual data, entertainment, encouragement or the like may be provided to user 101 at 154. At 155, exercise information may be received at wireless device 110 from exercise apparatus 102 or user 101. Exercise information may include results of the workout (e.g., distance run, weight lifted, calories expended, average heart rate, maximum heart rate, etc.). If user 101 has changed a setting of exercise apparatus 102 from the settings that were specified in fitness information 111 that was sent to exercise apparatus 102 in 153, then exercise information may include the changes so future workouts can use the changed settings, if desired. It will be appreciated that any type of workout, user 101 and/or exercise apparatus 102 related information may be included in the exercise information received by wireless device 110 at 155.

At 156, fitness information 111 may be updated and/or analyzed. In an embodiment, wireless device 110 may add the exercise information received at 155 to fitness information 111 that was already stored in wireless device 110. As a result, wireless device 110 may provide fitness information 111 to user 101 using the up-to-date information. In an alternative embodiment, fitness information 111 may be sent to, for example, computer 115 or database 114 by way of communication network 113, and then updating and/or analysis (either in addition to or in place of any analysis provided by wireless device 110) may be performed with respect to fitness information 111.

Figure 2B:
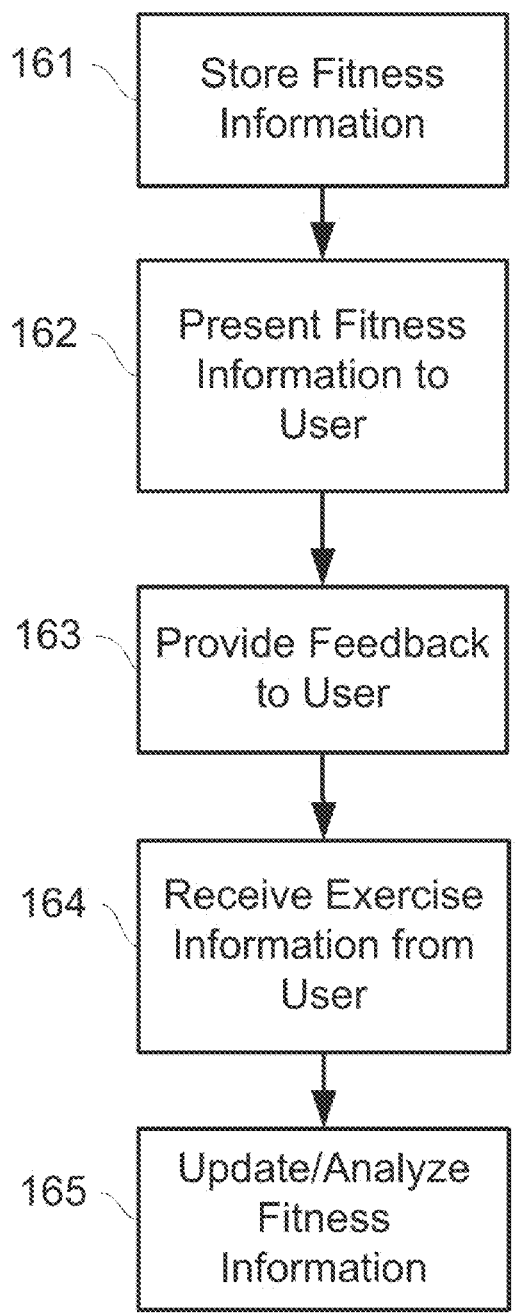

FIG. 2B is a flowchart illustrating an example method 160 in accordance with an embodiment. It will be appreciated that method 160 may be employed in connection with an embodiment where operative communication between wireless device 110 and exercise apparatus 102 is not available or desired. For example, user 101 may be working out with exercise apparatus 102 that is not capable of communication with wireless device 110 (e.g., older electrical exercise equipment, weights, etc.), or may not be using exercise apparatus 102 at all (e.g., user 101 is running outdoors, etc.).

At 161, fitness information 111 is stored within wireless device 110. As was noted above in connection with 151 of FIG. 2A, such storage may be performed automatically or manually by, for example, user 101. At 162, fitness information 111 may be presented to user 101 by way of, for example, a display or speakers of wireless interface 110 (i.e., by way of user interface module 123). In one embodiment, such fitness information 111 may be a listing of equipment settings that may be used by user 101 to, for example, set or adjust one or more settings on exercise apparatus 102. It should be appreciated that "adjusting a setting" in this context need not involve an adjustment to a piece of exercise machinery, but may simply be the selection of weight to place on a dumbbell or barbell, a fitness goal and the like. Thus, the term "setting" should be interpreted broadly to refer to any type of action that may be taken with respect to any type of exercise apparatus 102.

In another embodiment, user 101 may simply use fitness information 111 as a guide for a workout. Such a use may be appropriate when, for example, user 101 is not using exercise apparatus 102 as part of user 101's workout, or when any setting of exercise apparatus 102 is remembered by user 101, unnecessary based on the type of exercise apparatus 102 being used, or the like. As was the case above in connection with method 150 discussed in FIG. 2A, other functions may be performed by wireless device 110. For example, user 101 may use wireless device 110 to send or receive a phone call, text message or the like, view Internet content, listen to music, play a game and so forth.

At 163, feedback may be provided to user 101. Such feedback may be as was discussed above in connection with 154 of FIG. 2A. At 164, exercise information may be received at wireless device 110 from user 101. Exercise information may include, but is not limited to, workout results, workout notes, user 101 statistics (e.g., average heart rate, maximum heart rate, calories expended, etc.) and the like. In an alternative embodiment, wireless device 110 may receive exercise information from, for example, a heart rate monitor or other type of exercise tracking equipment. In such an embodiment, wireless device 110 may receive the exercise information by way of, for example, exercise communication module 126 or wireless communication module 123.

At 165, fitness information 111 is updated and/or analyzed. In an embodiment, wireless device 110 may add the exercise information received at 164 to fitness information 111 that was already stored in wireless device. As a result, wireless device 110 may provide workout and fitness information to user 101 using the up-to-date information. In an alternative embodiment, fitness information 111 may be sent to, for example, computer 115 or database 114 by way of communication network 113, and then updating and/or analysis (either in addition to or in place of any analysis provided by wireless device 110) may be performed with respect to fitness information 111.

Example Network and Operating Environments

The following description sets forth some example telephony radio networks and non-limiting operating environments in which wireless device 110 may be used. The below-described operating environments should be considered non-exhaustive, however, and thus the below-described network architecture merely shows an example network architecture in which aspects of various embodiments may be incorporated. One can appreciate, however, that aspects of an embodiment may be incorporated into now existing or future alternative architectures for communication networks.

The global system for mobile communication ("GSM") is one of the most widely-used wireless access systems in today's fast growing communication systems. GSM provides circuit-switched data services to subscribers, such as mobile telephone or computer users, for example. General Packet Radio Service ("GPRS"), which is an extension to GSM technology, introduces packet switching to GSM networks. GPRS uses a packet-based wireless communication technology to transfer high and low speed data and signaling in an efficient manner. GPRS optimizes the use of network and radio resources, thus enabling the cost effective and efficient use of GSM network resources for packet mode applications. For purposes of explanation, various embodiments are described herein in connection with GSM. The references to GSM are not exclusive, however, as it should be appreciated that embodiments may be implemented in connection with any type of wireless access system such as, for example, CDMA or the like.

As may be appreciated, the example GSM/GPRS environment and services described herein can also be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that shall become available in time. In this regard, the techniques of the various embodiments discussed below may be applied independently of the method of data transport, and does not depend on any particular network architecture, or underlying protocols.

Figure 3A:
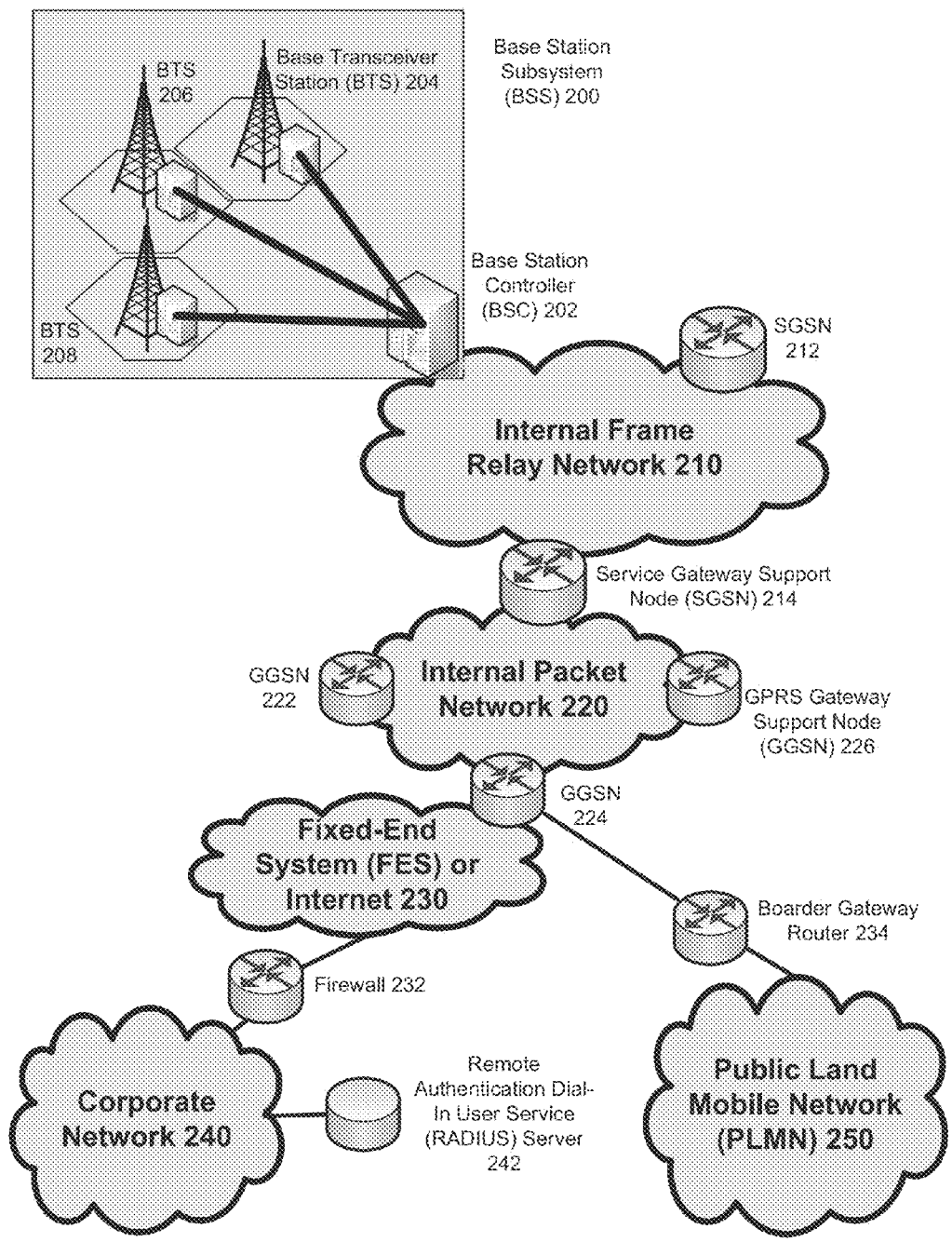
FIG. 3A illustrates an overview of a network environment in which aspects of an embodiment may be implemented.

FIG. 3A depicts an overall block diagram of an example packet-based mobile cellular network environment, such as a GPRS network, in which aspects of an embodiment may be practiced. In such an environment, there may be any number of subsystems that implement the functionality of the environment such as, for example, a plurality of Base Station Subsystems ("BSS") 200 (only one is shown in FIG. 3A), each of which comprises a Base Station Controller ("BSC") 202 serving a plurality of Base Transceiver Stations ("BTS") such as, for example, BTSs 204, 206 and 208. BTSs 204, 206, 208, etc., are the access points where users of packet-based mobile devices become connected to the wireless network. In one embodiment, the packet traffic originating from user devices is transported over the air interface to BTS 208, and from BTS 208 to BSC 202. Base station subsystems, such as BSS 200, may be a part of internal frame relay network 210 that may include Service GPRS Support Nodes ("SGSN") such as SGSN 212 and 214. Each SGSN 212, 214, etc. is in turn connected to internal packet network 220 through which SGSN 212, 214, etc. can route data packets to and from a plurality of gateway GPRS support nodes (GGSN) 222, 224, 226, etc. As illustrated, SGSN 214 and GGSNs 222, 224 and 226 are part of internal packet network 220. Gateway GPRS serving nodes 222, 224 and 226 may provide an interface to external Internet Protocol ("IP") networks such as Public Land Mobile Network ("PLMN") 250, corporate intranets 240, Fixed-End System ("FES"), the public Internet 230 or the like. As illustrated, subscriber corporate network 240 may be connected to GGSN 224 via firewall 232; and PLMN 250 may be connected to GGSN 224 via boarder gateway router 234. Remote Authentication Dial-In User Service ("RADIUS") server 242 may be used for caller authentication when a user of a mobile cellular device calls corporate network 240, for example.

Generally, there can be four different cell sizes in a GSM network—macro, micro, pico and umbrella cells. The coverage area of each cell is different in different environments.

Macro cells may be regarded as cells where the base station antenna is installed in a mast or a building above average roof top level. Micro cells are cells whose antenna height is under average roof top level; they are typically used in urban areas. Pico cells are small cells having a diameter is a few dozen meters; they are mainly used indoors. On the other hand, umbrella cells are used to cover shadowed regions of smaller cells and fill in gaps in coverage between those cells.

Figure 3B:
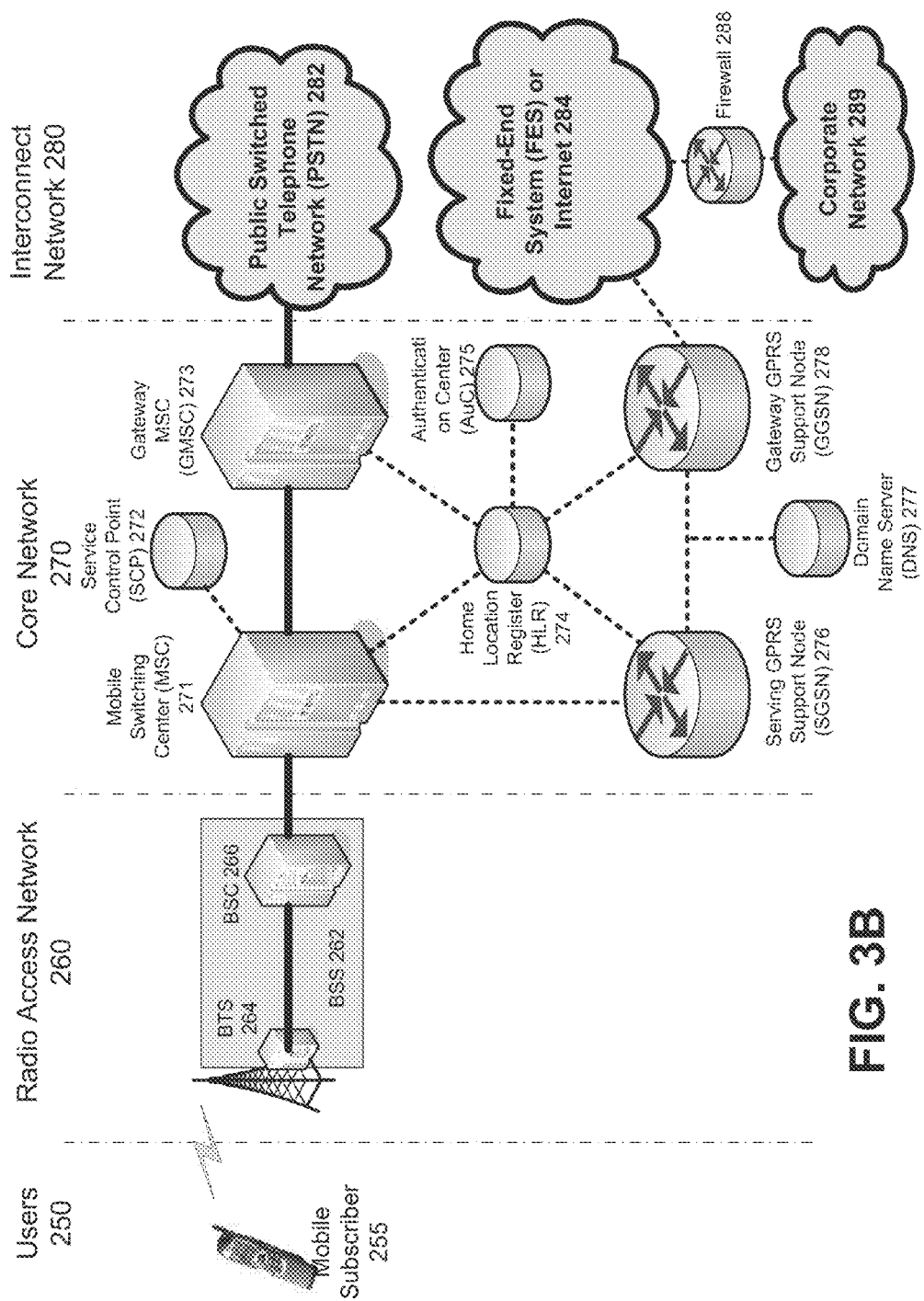
FIG. 3B illustrates a GPRS network architecture in which aspects of an embodiment may be implemented.

FIG. 3B illustrates the architecture of a typical GPRS network as segmented into four groups: users 250, radio access network 260, core network 270 and interconnect network 280. Users 250 comprise a plurality of end users (though only mobile subscriber 255 is shown in FIG. 3B). Radio access network 260 comprises a plurality of base station subsystems such as BSSs 262, which include BTSs 264 and BSCs 266. Core network 270 comprises a host of various network elements. As illustrated here, core network 270 may comprise Mobile Switching Center ("MSC") 271, Service Control Point ("SCP") 272, gateway MSC 273, SGSN 276, Home Location Register ("HLR") 274, Authentication Center ("AuC") 275, Domain Name Server ("DNS") 277 and GGSN 278. Interconnect network 280 also comprises a host of various networks and other network elements. As illustrated in FIG. 3B, interconnect network 280 comprises Public Switched Telephone Network ("PSTN") 282, Fixed-End System ("FES") or Internet 284, firewall 288 and Corporate Network 289.

A mobile switching center may be connected to a large number of base station controllers. At MSC 271, for example, depending on the type of traffic, the traffic may be separated such that voice may be sent to Public Switched Telephone Network ("PSTN") 282 through Gateway MSC ("GMSC") 273, and/or data may be sent to SGSN 276, which then sends the data traffic to GGSN 278 for further forwarding.

When MSC 271 receives call traffic, for example, from BSC 266, it may send a query to a database hosted by SCP 272. The SCP 272 processes the request and issues a response to MSC 271 so that it may continue call processing as appropriate.

HLR 274 is a centralized database for users to register to the GPRS network. HLR 274 stores static information about the subscribers such as the International Mobile Subscriber Identity ("IMSI"), subscribed services, and a key for authenticating the subscriber. HLR 274 also stores dynamic subscriber information such as the current location of the mobile subscriber. Associated with HLR 274 may be AuC 275. AuC 275 is a database that contains the algorithms for authenticating subscribers and includes the associated keys for encryption to safeguard the user input for authentication.

In the following, depending on context, the term "mobile subscriber" may refer to either the end user or to the actual portable device used by an end user of the mobile cellular service. When a mobile subscriber turns on his or her mobile device, the mobile device goes through an attach process by which the mobile device attaches to an SGSN of the GPRS network. Referring now to FIG. 3B, when mobile subscriber 255 initiates the attach process by turning on the network capabilities of the mobile device, an attach request is sent by mobile subscriber 255 to SGSN 276. The SGSN 276 queries another SGSN, to which mobile subscriber 255 was attached before, for the identity of mobile subscriber 255. Upon receiving the identity of mobile subscriber 255 from the other SGSN, SGSN 276 requests more information from mobile subscriber 255. This information is used to authenticate mobile subscriber 255 to SGSN 276 by HLR 274. Once verified, SGSN 276 sends a location update to HLR 274 indicating the change of location to a new SGSN, in this case SGSN 276. HLR 274 notifies the old SGSN, to which mobile subscriber 255 was attached, to cancel the location process for mobile subscriber 255. HLR 274 then notifies SGSN 276 that the location update has been performed. At this time, SGSN 276 sends an Attach Accept message to mobile subscriber 255, which in turn sends an Attach Complete message to SGSN 276.

After attaching itself with the network, mobile subscriber 255 then goes through the authentication process. In the authentication process, SGSN 276 sends the authentication information to HLR 274, which sends information back to SGSN 276 based on the user profile that was part of the user's initial setup. SGSN 276 then sends a request for authentication and ciphering to mobile subscriber 255. Mobile subscriber 255 uses an algorithm to send the user identification (ID) and password to SGSN 276. SGSN 276 uses the same algorithm and compares the result. If a match occurs, SGSN 276 authenticates mobile subscriber 255.

Next, mobile subscriber 255 establishes a user session with the destination network, corporate network 289, by going through a Packet Data Protocol ("PDP") activation process. Briefly, in the process, mobile subscriber 255 requests access to the Access Point Name ("APN"), for example, UPS.com (e.g., which can be corporate network 279) and SGSN 276 receives the activation request from mobile subscriber 255. SGSN 276 then initiates a Domain Name Service ("DNS") query to learn which GGSN node has access to the UPS.com APN. The DNS query is sent to the DNS server within the core network 270, such as DNS 277, which is provisioned to map to one or more GGSN nodes in the core network 270. Based on the APN, the mapped GGSN 278 can access the requested corporate network 279. The SGSN 276 then sends to GGSN 278 a Create Packet Data Protocol ("PDP") Context Request message that contains necessary information. The GGSN 278 sends a Create PDP Context Response message to SGSN 276, which then sends an Activate PDP Context Accept message to mobile subscriber 255.

Once activated, data packets of the call made by mobile subscriber 255 can then go through radio access network 260, core network 270, and interconnect network 280, in particular fixed-end system or Internet 284 and firewall 288, to reach corporate network 289.

Thus, network elements that may implicate the functionality of the service delivery based on real-time performance requirement(s) in accordance with an embodiment may include but are not limited to Gateway GPRS Support Node tables, Fixed End System router tables, firewall systems, VPN tunnels and any number of other network elements as required by the particular digital network.

Figure 3C:
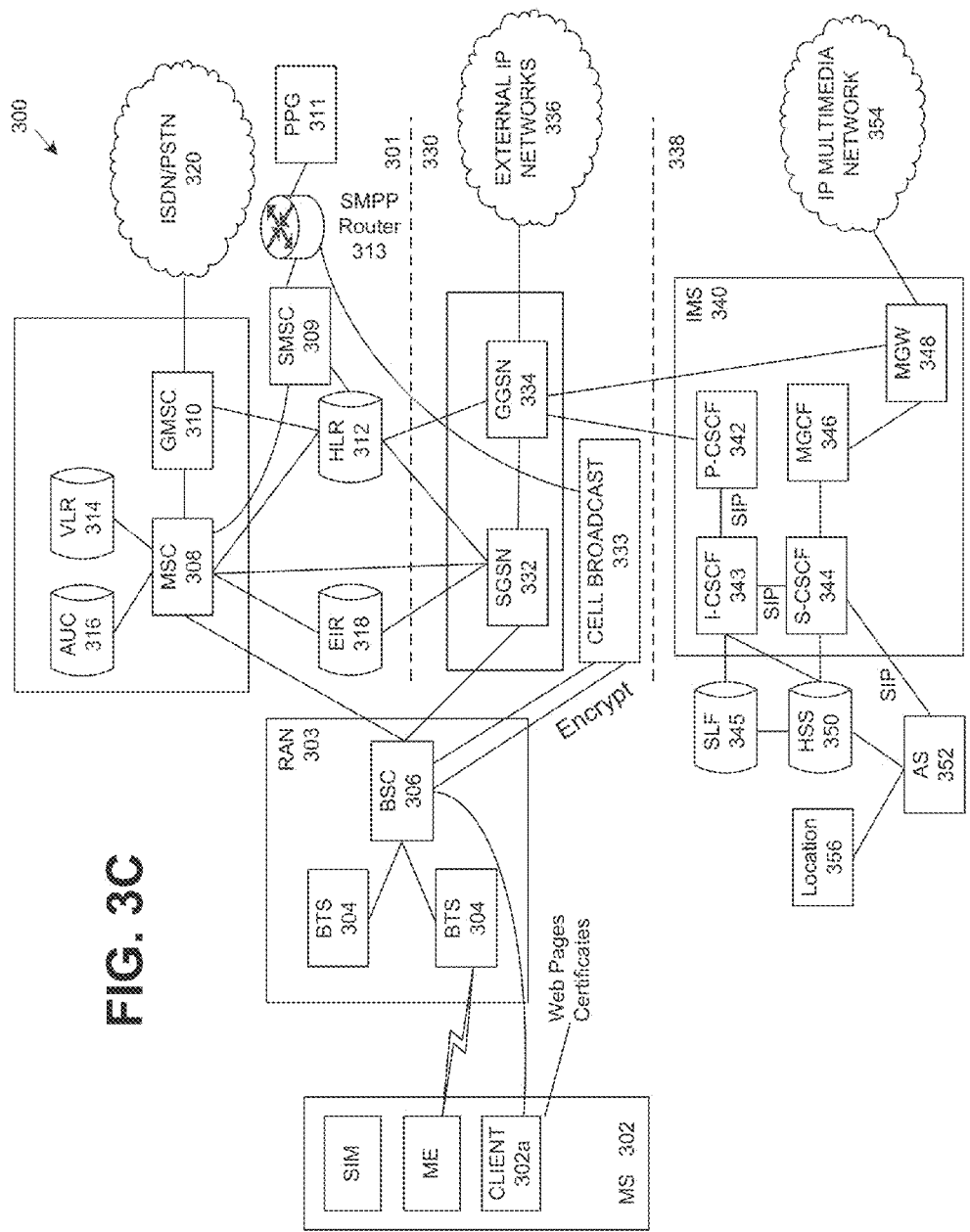
FIG. 3C illustrates an alternate block diagram of an example GSM/GPRS/IP multimedia network architecture in which aspects of an embodiment may be implemented.

FIG. 3C shows another example block diagram view of a GSM/GPRS/IP multimedia network architecture 300 in which the apparatus and methods for transferring multimedia content between receiving devices of the below-discussed embodiments may be incorporated. As illustrated, architecture 300 of FIG. 3C includes GSM core network 301, GPRS network 330 and IP multimedia network 338. GSM core network 301 includes Mobile Station (MS) 302, at least one Base Transceiver Station (BTS) 304 and Base Station Controller (BSC) 306. MS 302 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. BTS 304 is physical equipment, such as a radio tower, that enables a radio interface to communicate with the MS. Each BTS may serve more than one MS. BSC 306 manages radio resources, including the BTS. The BSC may be connected to several BTSs. The BSC and BTS components, in combination, are generally referred to as a base station (BSS) or radio access network (RAN) 303.

GSM core network 301 also includes Mobile Switching Center (MSC) 308, Gateway Mobile Switching Center (GMSC) 310, Home Location Register (HLR) 312, Visitor Location Register (VLR) 314, Authentication Center (AuC) 318 and Equipment Identity Register (EIR) 316. MSC 308 performs a switching function for the network. The MSC also performs other functions, such as registration, authentication, location updating, handovers and call routing. GMSC 310 provides a gateway between the GSM network and other networks, such as an Integrated Services Digital Network (ISDN) or Public Switched Telephone Networks (PSTNs) 320. In other words, GMSC 310 provides interworking functionality with external networks.

HLR 312 is a database that contains administrative information regarding each subscriber registered in a corresponding GSM network. HLR 312 also contains the current location of each MS. VLR 314 is a database that contains selected administrative information from HLR 312. The VLR contains information necessary for call control and provision of subscribed services for each MS currently located in a geographical area controlled by the VLR. HLR 312 and VLR 314, together with MSC 308, provide the call routing and roaming capabilities of GSM. AuC 316 provides the parameters needed for authentication and encryption functions. Such parameters allow verification of a subscriber's identity. EIR 318 stores security-sensitive information about the mobile equipment.

Short Message Service Center (SMSC) 309 allows one-to-one Short Message Service (SMS) messages to be sent to/from MS 302. Push Proxy Gateway (PPG) 311 is used to "push" (i.e., send without a synchronous request) content to MS 102. PPG 311 acts as a proxy between wired and wireless networks to facilitate pushing of data to MS 302. Short Message Peer to Peer (SMPP) protocol router 313 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. MS 302 sends a location update including its current location information to the MSC/VLR, via BTS 304 and BSC 306. The location information is then sent to the MS's HLR. The HLR is updated with the location information received from the MSC/VLR. The location update also is performed when the MS moves to a new location area. Typically, the location update is periodically performed to update the database as location updating events occur.

GPRS network 330 is logically implemented on the GSM core network architecture by introducing two packet-switching network nodes, a serving GPRS support node (SGSN) 332, a cell broadcast and a Gateway GPRS support node (GGSN) 334. SGSN 332 is at the same hierarchical level as MSC 308 in the GSM network. The SGSN controls the connection between the GPRS network and MS 302. The SGSN also keeps track of individual MS's locations and security functions and access controls.

Cell Broadcast Center (CBC) 333 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

GGSN 334 provides a gateway between the GPRS network and a public packet network (PDN) or other IP networks 336. That is, the GGSN provides interworking functionality with external networks, and sets up a logical link to the MS through the SGSN. When packet-switched data leaves the GPRS network, it is transferred to external TCP-IP network 336, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

GPRS network 330 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

IP multimedia network 338 was introduced with 3GPP Release 5, and includes IP multimedia subsystem (IMS) 340 to provide rich multimedia services to end users. A representative set of the network entities within IMS 340 are a call/session control function (CSCF), media gateway control function (MGCF) 346, media gateway (MGW) 348, and a master subscriber database, referred to as a home subscriber server (HSS) 350. HSS 350 may be common to GSM network 301, GPRS network 330 as well as IP multimedia network 338.

IP multimedia system 340 is built around the call/session control function, of which there are three types: interrogating CSCF (I-CSCF) 343, proxy CSCF (P-CSCF) 342 and serving CSCF (S-CSCF) 344. P-CSCF 342 is the MS's first point of contact with IMS 340. P-CSCF 342 forwards session initiation protocol (SIP) messages received from the MS to an SIP server in a home network (and vice versa) of the MS. P-CSCF 342 may also modify an outgoing request according to a set of rules defined by the network operator (for example, address analysis and potential modification).

I-CSCF 343 forms an entrance to a home network and hides the inner topology of the home network from other networks and provides flexibility for selecting an S-CSCF. I-CSCF 343 may contact subscriber location function (SLF) 345 to determine which HSS 350 to use for the particular subscriber, if multiple HSSs 350 are present. S-CSCF 344 performs the session control services for MS 302. This includes routing originating sessions to external networks and routing terminating sessions to visited networks. S-CSCF 344 also decides whether application server (AS) 352 is required to receive information on an incoming SIP session request to ensure appropriate service handling. This decision is based on information received from HSS 350 (or other sources, such as application server 352). AS 352 also communicates to location server 356 (e.g., a Gateway Mobile Location Center (GMLC)) that provides a position (e.g., latitude/longitude coordinates) of MS 302.

HSS 350 contains a subscriber profile and keeps track of which core network node is currently handling the subscriber. It also supports subscriber authentication and authorization functions (AAA). In networks with more than one HSS 350, a subscriber location function provides information on HSS 350 that contains the profile of a given subscriber.

The MGCF 346 provides interworking functionality between SIP session control signaling from IMS 340 and ISUP/BICC call control signaling from the external GSTN networks (not shown). It also controls media gateway (MGW) 348 that provides user-plane interworking functionality (e.g., converting between AMR- and PCM-coded voice). MGW 348 also communicates with other IP multimedia networks 354.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, may not indicate the actual physical location of the mobile phones outside the pre-defined area.

While the various embodiments have been described in connection with the preferred embodiments of the various figures, it is to be understood that other similar embodiments may be used or modifications and additions may be made to the described embodiment for performing the same function of the various embodiments without deviating therefrom. Therefore, the embodiments should not be limited to any single embodiment, but rather should be construed in breadth and scope in accordance with the appended claims.

What is claimed:

1. A tangible computer-readable storage medium having executable instructions stored thereon, the executable instructions, when executed by a processor, perform operations comprising:
   receiving, at a fitness analysis system, a fitness information request applicable to a predetermined routine, wherein the fitness information request comprises an indication of an exercise apparatus type;
   sending a first setting associated with the exercise apparatus type and the predetermined routine to facilitate a workout using an exercise apparatus related to the exercise apparatus type;
   receiving, during the workout, exercise information corresponding to the workout via a portable wireless communication device, wherein the exercise information comprises at least one of a workout result, changed exercise apparatus settings, or changed predetermined routine fitness information;
   updating, during the workout, fitness information stored on the fitness analysis system responsive to the received exercise information; and
   analyzing, by the fitness analysis system, the updated fitness information to generate a second setting associated with the exercise apparatus type for a subsequent workout, wherein:
      the second setting is generated during the workout; and
      the second setting is obtainable during the subsequent workout.

2. The computer-readable storage medium of claim 1, wherein the exercise information is originated from the exercise apparatus.

3. The computer-readable storage medium of claim 1, wherein the first setting associated with the exercise apparatus type is sent to a portable wireless communication device.

4. The computer-readable storage medium of claim 1, wherein the first setting associated with the exercise apparatus type is sent to the exercise apparatus.

5. The computer-readable storage medium of claim 1, the operations further comprising sending feedback regarding the workout to a portable wireless communication device.

6. The computer-readable storage medium of claim 1, the operations further comprising sending workout information during the workout, the workout information comprising at least one of workout progress, workout-related encouragement, or workout statistics.

7. The computer-readable storage medium of claim 1, the operations further comprising sending a third setting associated with the exercise apparatus type and the predetermined routine to the exercise apparatus during the workout.

8. The computer-readable storage medium of claim 1, the operations further comprising generating a plan for a future workout according to the updated fitness information.

9. A tangible computer-readable storage medium having executable instructions stored thereon, the executable instructions, when executed by a processor, perform operations comprising:
   storing fitness information applicable to a user on a portable wireless communications device, wherein the fitness information comprises at least one of exercise apparatus settings, user fitness information, or user fitness tracking data;
   accessing the fitness information from the portable wireless communication device;
   establishing operative communication between an exercise apparatus and the portable wireless communication device;
   sending at least a subset of the fitness information from the portable wireless communication device to the exercise apparatus to facilitate a user workout using the exercise apparatus, wherein the at least a subset of the fitness information comprises a first setting of the exercise apparatus;
   receiving exercise information on the portable wireless communication device corresponding to the user workout from the exercise apparatus, wherein the exercise information comprises at least one of results of a workout, changed exercise apparatus settings, or changed user fitness information;
   updating, during the workout, the at least a subset of the fitness information responsive to the received exercise information; and storing only in the portable wireless communications device, during the workout at least a subset of the updated fitness information for a subsequent workout, wherein the at least a subset of the updated fitness information comprises a second setting of the exercise apparatus obtainable only from the portable wireless communications device, during the subsequent workout.

10. The computer-readable storage medium of claim 9, the operations further comprising providing feedback regarding the user workout to the user on the portable wireless communication device.

11. The computer-readable storage medium of claim 10, wherein providing feedback further comprises providing statistical information relating to the workout.

12. The computer-readable storage medium of claim 9, wherein the exercise information comprises a change during the user workout to the at least one setting of the exercise apparatus.

13. The computer-readable storage medium of claim 9, the operations further comprising presenting information to the user during the user workout on the wireless communication device.

14. The computer-readable storage medium of claim 13, wherein the presented information comprises at least one of user workout progress, workout-related encouragement, or user workout statistics.

15. The computer-readable storage medium of claim 9, the operations further comprising planning a future workout according to the updated at least a subset of the fitness information.

16. The computer-readable storage medium of claim 9, wherein communication is established with the exercise apparatus by way of one of a wired or wireless connection.

17. A tangible computer-readable storage medium having executable instructions stored thereon, the executable instructions, when executed by a processor, perform operations comprising:

receiving fitness information from a remote device on a portable wireless device, wherein the fitness information comprises at least one of exercise apparatus settings, user fitness information, or user fitness tracking data;

storing the fitness information in a memory of the portable wireless device;

presenting at least a subset of the fitness information to user on the portable wireless device;

sending at least a first subset of the fitness information from the portable wireless device to the exercise apparatus, the at least a first subset of the fitness information comprising the first setting of the exercise apparatus;

receiving exercise information relating to the user workout on the portable wireless device, the exercise information comprising a second setting of an exercise apparatus for a subsequent workout, wherein the exercise information comprises at least one of results of a workout, changed exercise apparatus settings, or changed user fitness information;

updating the fitness information stored in the memory responsive to the received exercise information, generating updated fitness information; and sending at least a subset of the updated fitness information from the portable wireless device to the exercise apparatus, the at least a subset of the updated fitness information comprising the second setting of the exercise apparatus for the subsequent workout obtainable only from the portable wireless device, during the subsequent workout.

18. The computer-readable storage medium of claim 17, the operations further comprising providing feedback regarding the user workout to the user.

* * * * *